J. S. KEMP.
BEATER TOOTH.
APPLICATION FILED DEC. 31, 1909. RENEWED JAN. 28, 1911.
988,718.
Patented Apr. 4, 1911.
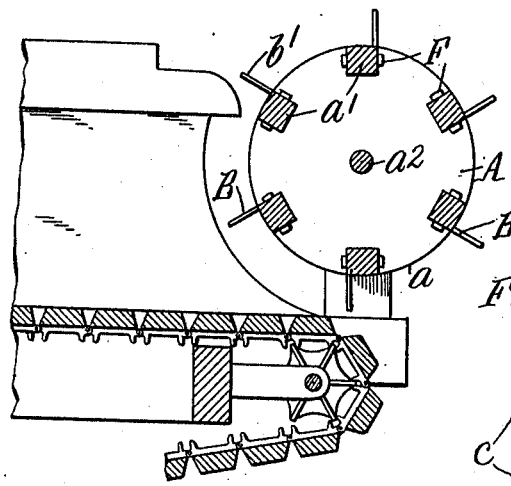
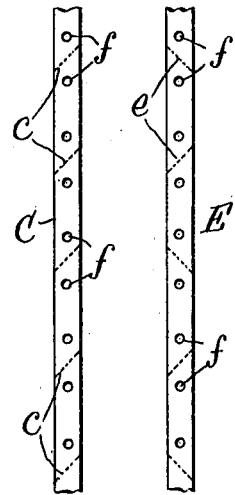
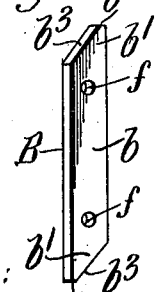
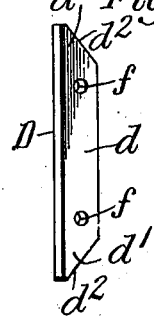
Witnesses:
E. A. Volk
C. H. Bund.
Joseph S. Kemp, Inventor.
by Wilhelm Parker Hand, Attorneys.

UNITED STATES PATENT OFFICE.

JOSEPH S. KEMP, OF STRATFORD, ONTARIO, CANADA, ASSIGNOR TO THE INTERNATIONAL HARVESTER COMPANY, OF CHICAGO, ILLINOIS.

BEATER-TOOTH.

988,718. Specification of Letters Patent. Patented Apr. 4, 1911.

Application filed December 31, 1909, Serial No. 535,757. Renewed January 28, 1911. Serial No. 605,290.

*To all whom it may concern:*

Be it known that I, JOSEPH S. KEMP, a citizen of the United States, residing at Stratford, in the Province of Ontario, in the Dominion of Canada, have invented a new and useful Improvement in Beater-Teeth, of which the following is a specification.

This invention relates to improvements in beater teeth for the beaters of fertilizer distributers of that class which are provided at the rear end of the wagon body or receptacle for the material, with a rotary or other movable beater or distributer by which the manure or fertilizing material is distributed in a rearward direction and which is provided with rows of teeth which assist in detaching the manure from the mass in the wagon and breaking up the same.

The object of this invention is to provide beater teeth of simple and economical construction which will effectively break up and scatter the material passing over the beater, and are so formed that either end of each tooth can be used as the point thereof and each tooth can be secured to the beater with either end projecting therefrom to engage the material. This permits the position of the tooth on the beater to be reversed when one end has become worn, so that the other end may be used as the engaging point of the tooth.

In the accompanying drawings: Figure 1 is a fragmentary end elevation of a fertilizer distributer having a beater provided with teeth embodying the invention. Fig. 2 is a fragmentary sectional elevation thereof on line 2—2, Fig. 1. Fig. 3 is a perspective view of one of the beater teeth. Fig. 4 is a plan view of the bar from which the teeth are formed. Fig. 5 is a perspective view of a tooth of modified construction. Fig. 6 is a plan view of the bar from which the same is formed.

Like reference characters refer to like parts in the several figures.

A represents the usual beater cylinder or drum of a fertilizer distributer, having opposite end heads $a$ connected by a plurality of staves or slats $a'$ and mounted upon a beater shaft $a^2$ which is journaled in the sides of the wagon body and rotated by any suitable driving mechanism. All of these parts may be of any suitable construction.

B B represent the beater teeth, which are arranged at intervals along the staves $a'$ of the beater. These teeth have broad flat faces and opposite pointed or beveled ends and each tooth is secured at one end to the beater so that its other end will project outwardly therefrom and one of its flat faces will be presented to the material to be distributed. The flat faces serve to engage and carry the material over the beater and distribute the same. In the construction shown in Figs. 1–4, each tooth comprises a shank or body portion $b$ and opposite end portions $b'$ which are beveled or pointed. The pointed end portions $b'$ extend from the diagonally opposite corners of the shank $b$ each having a straight edge on one side corresponding with the edge of the shank portion, and an inclined or beveled edge $b^3$ on its opposite side, the inclined edges $b^3$ of the opposite end portions of each tooth being parallel with each other. The teeth are formed from flat steel bars or blanks C, having plane sides and straight edges, by a series of diagonal cuts $c$, shown in dotted lines in Fig. 4, and the shape of the teeth is such that successive teeth may be cut or stamped from a single blank without any loss or waste of material between them. The beveled end portions of the teeth are preferably provided with blunt ends $b^4$ which can be formed on the teeth after they have been cut from the blank or in the act of cutting them from the blank.

In Figs. 5 and 6 is shown a tooth D of modified form which differs from the teeth above described in that its pointed ends $d'$ are arranged directly opposite to each other on the same side edge of the shank portion $d$ and their inclined edges $d^2$ extend at an angle to each other. The teeth D can be formed successively from a single flat bar, or blank E, in the same manner as the teeth B with the exception that the alternate cuts $e$ are at an angle to each other, as shown in dotted lines in Fig. 6.

While the two forms of teeth above described represent preferred constructions, the invention is not limited to these but covers other forms of teeth having opposite pointed end portions which can be formed successively from a single bar or blank with a minimum waste of material.

The teeth are adapted to be detachably secured at either end to the staves of the beater. The position of the teeth may thus be reversed when desired and their opposite ends secured to the beater. This makes it possible to change ends with the teeth whenever their projecting ends or points become worn through use. Any suitable securing means may be employed for this purpose.

In the construction shown, the teeth are detachably secured at one end to the staves *a'* of the beater by bolts F and have their broad flat sides extending parallel with the axis of the beater so as to present one of these sides to the material to be distributed. Each tooth is provided with corresponding bolt holes *f f* near its ends and the bolt F engages in the hole which is at the inner end of the tooth. The hole in the other or outer end of the tooth is adapted to be engaged by the bolt F when the tooth is reversed and that end can be thus secured by the bolt to the beater when desired. Each tooth is thus reversible on the beater and can be secured thereto at either end with its other or opposite end projecting outwardly to engage the material.

The beater teeth can be economically manufactured, there being little, if any, waste of material in cutting them from the blank, and owing to their being reversible, both ends can be successively utilized as the point or outer end of the tooth so that the teeth can be used for a much greater length of time and will stand a far greater amount of wear than teeth which are not reversible.

I claim as my invention:

1. A reversible beater tooth for the beaters of fertilizer distributers, having relatively broad sides and opposite beveled ends, the inclined edges of which extend transversely of said tooth in the direction of its breadth, said tooth being adapted to be secured at either end to the beater with its broad sides parallel with the axis of the beater and its opposite beveled end projecting outwardly therefrom, substantially as set forth.

2. A reversible beater tooth for the beaters of fertilizer distributers, having relatively broad sides and opposite beveled ends, said tooth being adapted to be secured at either end to the beater with its broad sides parallel with the axis of the beater and its opposite beveled end projecting outwardly therefrom, substantially as set forth.

3. A reversible beater tooth for the beaters of fertilizer distributers, having relatively broad sides and opposite beveled ends, the inclined edges of which are parallel, said tooth being adapted to be secured at either end to the beater with its broad sides parallel with the axis of the beater and its opposite beveled end projecting outwardly therefrom, substantially as set forth.

4. A reversible beater tooth for the beaters of fertilizer distributers having opposite beveled ends and provided with bolt holes adjacent to said ends which are adapted to receive bolts for securing either end of the tooth to the beater with its opposite beveled end projecting outwardly therefrom, substantially as set forth.

Witness my hand, this 22d day of December, 1909.

JOSEPH S. KEMP.

Witnesses:
EDWARD WILHELM,
C. B. HORNBECK.

---

Copies of this patent may be obtained for five cents each, by addressing the "Commissioner of Patents, Washington, D. C."